March 19, 1946.  H. J. LOUNSBURY  2,396,796
RAILWAY CAR TRUCK
Filed June 28, 1944
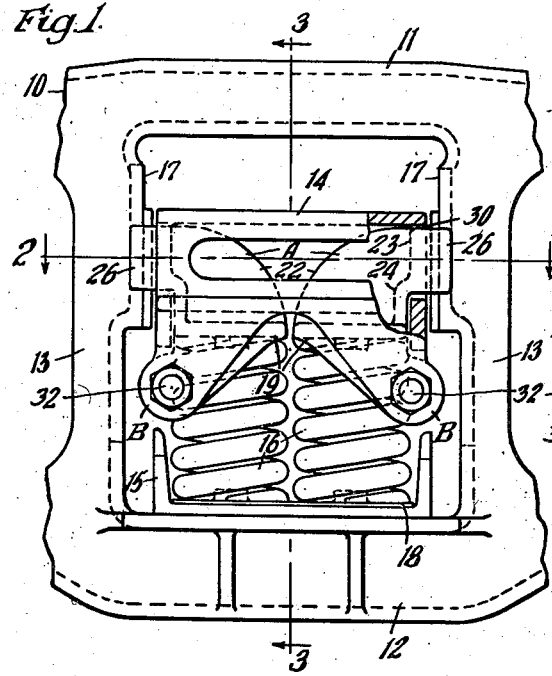
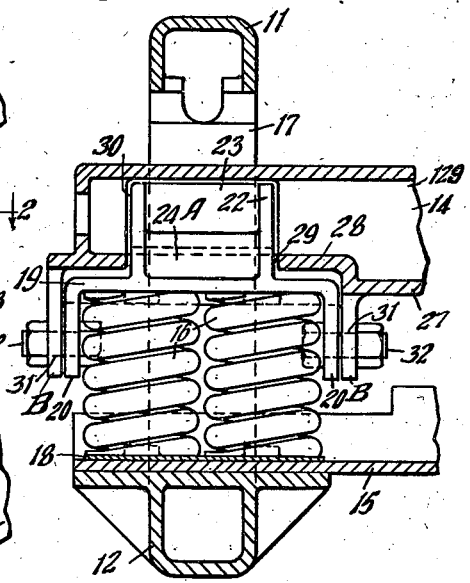
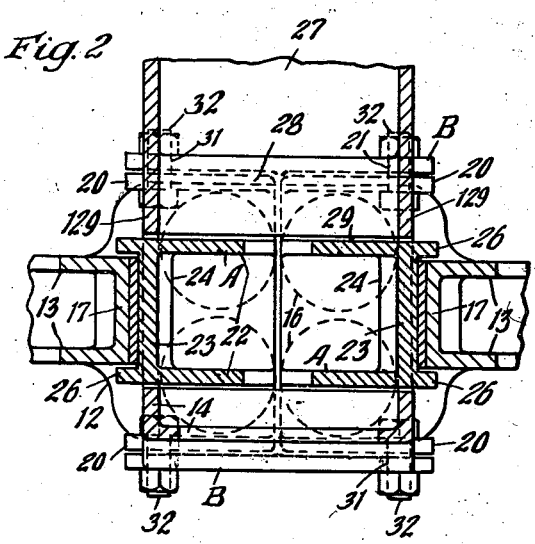
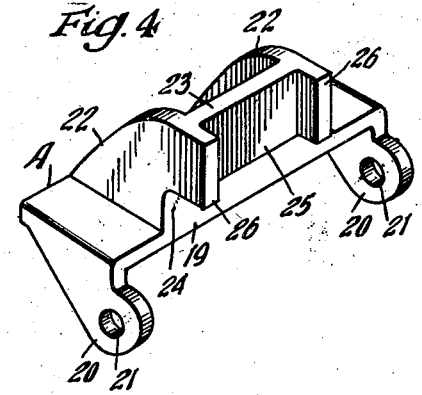
Inventor
Harvey J. Lounsbury
By Henry Fuchs.
Atty.

Patented Mar. 19, 1946

2,396,796

UNITED STATES PATENT OFFICE 2,396,796

RAILWAY CAR TRUCK

Harvey J. Lounsbury, Glen Ellyn, Ill., assignor to W. H. Miner, Inc., Chicago, Ill., a corporation of Delaware Application June 28, 1944, Serial No. 542,466

8 Claims. (Cl. 105—197)

This invention relates to improvements in railway car trucks.

One object of the invention is to provide means supplemental to the usual truck springs of a railway car truck for snubbing the action of the truck springs, comprising slidable friction elements movable with the truck bolster and frictionally engaging the bolster guides of the truck side frames, wherein the friction elements are pivotally attached to the bolster to swing toward the bolster guides of the side frames and are forced against the guides by the usual truck springs, which yieldingly support the bolster on the side frames.

A further object of the invention is to provide a truck structure, as set forth in the preceding paragraph, wherein the friction elements are formed with guide seats which accommodate the bolster guides of the side frames of the truck to guide the truck bolster in its vertical movements.

Other objects of the invention will more clearly appear from the description and claims hereinafter following.

In the drawing forming a part of this specification, Figure 1 is a side elevational view of a portion of a railway car truck showing the truck bolster partly in section and illustrating my improvements in connection therewith. Figure 2 is a horizontal sectional view, corresponding substantially to the line 2—2 of Figure 1, showing that portion of the truck at one side of the side frame members thereof. Figure 3 is a vertical sectional view, corresponding substantially to the line 3—3 of Figure 1. Figure 4 is a detail perspective view of one of the friction members employed in the truck structure illustrated in Figures 1, 2, and 3.

In said drawing, 10 indicates one of the side frame members of a railway car truck. The side frame 10, as shown, is in the form of a casting and has top and bottom members 11 and 12 connected by spaced vertical sections 13—13, forming guides for the truck bolster. As will be understood by those skilled in this art, the truck includes two side frame members 10—10, a truck bolster 14, a transversely disposed spring plank 15 connecting the two side frame members and supported at opposite ends on the bottom members 12—12 of the side frames 10—10, and truck springs 16—16. The bolster 14 has its opposite ends guided between the vertical sections 13—13 of the truck side frames and is supported by the springs 16—16. As most clearly shown in Figure 1, the sections 13—13 are inwardly offset at their upper end portions to provide guides 17—17. The truck springs 16—16 are supported directly on the bottom members 12—12 of the side frames 10—10, the usual bottom spring follower plate 18 being interposed between each truck spring cluster and the spring plank.

In carrying out my invention, I provide broadly a pair of rocking friction elements A—A at opposite sides of the truck, and brackets B—B—B—B depending from each end of the truck bolster, the latter being cut out to accommodate the friction members, which have sliding engagement with the bolster guides of the truck side frames and with which the truck springs cooperate to press the same against the guides.

The rocking friction elements A—A, which are located in pairs at opposite ends of the bolster 14, are of like design, each including a relatively wide base portion 19 in the form of a flat plate, depending ears 20 at opposite ends of each plate portion 19, offset laterally outwardly of the plate, and provided with transversely aligned pivot pin receiving openings 21—21, upstanding, laterally spaced, parallel flanges 22—22 on said base plate 19, extending transversely of the same, and a vertical wall 23 at the outer edge of the platelike base portion having its lower end section, which is indicated by 24, inwardly offset and flush with the edge of the plate 19. The wall 23 extends from one flange 22 to the other, as clearly shown in Figures 2, 3, and 4, and presents a vertically disposed, flat friction surface 25 on the outer side. The flanges 22—22 are spaced inwardly from opposite end edges of the plate or base 19, as most clearly shown in Figure 4, and have extensions 26—26 projecting outwardly beyond the wall 23. The extensions 26—26 form laterally spaced guide ribs which embrace the corresponding bolster guide 17 at opposite sides, the ribs 26—26, together with the wall 23, forming a guide seat for said bolster guide 17. As shown most clearly in Figures 1 and 4, the ribs 26—26 are of lesser height than the flanges 22—22, having their lower ends terminating some distance above the level of the plate 19.

The bolster 14 is provided with the usual bottom wall 27, which is upwardly offset at opposite ends, as indicated at 28, to provide seats to accommodate the platelike base portions 19—19 of the two pairs of friction elements A—A and A—A at opposite ends of said bolster. The offset wall section 28 at each end of the bolster is provided with a rectangular opening 29 adapted to accommodate the upper members of the friction element, which upper members comprise the flanges 22—22 and the wall 23. The vertical side walls of the bolster, which are indicated by 129—129, are cut out at the bolster guide portions of the side frames to provide openings 30—30 for a purpose hereinafter pointed out. Each opening 30 is preferably of rectangular outline, of a width to freely accommodate the projecting portion of the friction element A formed by the ribs 26—26, and of a height to freely accommodate the height of said ribs and the portion of the wall 23 above the inwardly offset lower end section 24 of said wall.

The brackets B—B—B—B, which are arranged in sets of four, at opposite ends of the bolster 14, are in the form of depending ears preferably cast integral with the bolster. The set of brackets at each end of the bolster comprises a pair of outer members and a pair of inner members, the two outer brackets being in vertical alignment with the outer end wall of the bolster and the two inner brackets being located on said bolster inwardly of the corresponding side frame of the truck, in spaced relation to said side frame. The brackets B—B of each pair diverge downwardly and outwardly away from each other, thus having their lower end portions located respectively at the front and rear sides of the bolster. Each bracket B is provided with a transversely extending pivot pin receiving opening 31 at its lower end for a purpose hereinafter pointed out.

The friction elements A—A at each end of the bolster are hinged respectively to the brackets B—B and B—B at the front and rear side portions of the bolster 14, with the upstanding sections, comprising the flanges 22—22—22—22 and the walls 23—23 thereof, extending through the openings 30 and 29—29 of the bolster and the walls 23—23 engaging the flat vertical faces of the spaced bolster guides 17—17 of the corresponding side frame. The hinged connection between the brackets B—B and each friction element is provided by short pivot pins, in the form of bolts 32—32, extending through the pivot pin receiving openings 31—31 of the brackets and the openings 21—21 of the ears 20—20 of said friction elements.

The platelike base portions 19—19 of the friction elements A—A at each side of the truck bear directly on the upper ends of the truck springs 16—16, which are illustrated as composed of a cluster of four springs, the two springs at the front of the cluster engaging the plate 19 of the front friction element and the two springs at the rear of the cluster engaging the plate 19 of the rear friction element. As will be evident, the platelike base portions 19—19 of the friction elements A—A are subjected to the pressure of the springs 16—16 and the tendency is to rock these elements outwardly toward the bolster guides to press the friction surfaces 25—25 of said elements into tight frictional contact with the friction surfaces presented by the vertical flat faces of the bolster guides 17—17. Inasmuch as the ribs 26—26 of the friction elements embrace the bolster guides 17—17, the bolster is properly guided for vertical movement having its lateral motion limited by said ribs.

The operation of my improved dampening or snubbing device is as follows: Upon relative vertical movement of the bolster 14 with respect to the side frames 10, the coils of the cluster or group of springs 16 are compressed between the bolster and the spring plank. At the same time the friction elements A—A are forced to slide vertically along the bolster guides, moving in unison with the bolster. A friction snubbing action is thus produced during compression of the springs. During recoil of the springs, the friction elements A—A move upwardly with the bolster 14 and, due to frictional engagement with the guides 17—17, dampen the recoil action. During both compression and expansion of the truck springs, the friction elements are urged into tight frictional contact with the friction surfaces of the bolster guides by the action of the springs which exert pressure on the base portions 19—19 of said elements A—A to rock the latter outwardly away from the bolster.

As will be evident, as the springs are being compressed, the frictional resistance produced by movement of the elements A—A with respect to the bolster guides is augmented due to the increased pressure of the springs on the base portions 19—19. As the springs recoil, the frictional resistance is progressively reduced due to the reduction of the spring pressure on the rocking friction elements.

I have herein shown and described what I now consider the preferred manner of carrying out my invention, but the same is merely illustrative and I contemplate all changes and modifications that come within the scope of the claims appended hereto.

I claim:

1. In a railway car truck including a truck side frame having spaced bolster guides, the combination with a vertically movable bolster; of a cluster of truck springs supporting said bolster; and rocking friction elements hinged to opposite sides of the bolster to swing about a fixed axis with respect to the bolster, each of said elements having a friction surface engaging the corresponding bolster guide, each of said elements also having base portion rigid therewith, said base portions of said elements being acted on by said springs to rock said friction elements against the guides.

2. In a railway car truck including a truck side frame having spaced bolster guides, the combination with a vertically movable bolster; of a cluster of springs supporting said bolster on the side frame; and a pair of rocking friction elements, each hinged to said bolster for swinging movement about an axis fixed with respect to the bolster and movable therewith, each of said rocking elements having a friction surface thereon engaging the bolster guides, and a base portion rigid therewith, said base portions of said pair of elements bearing on said springs, whereby the expansive action of the springs rocks said friction elements to force the friction surfaces thereof into tight frictional engagement with the bolster guides.

3. In a railway car truck including a truck side frame having spaced bolster guides, the combination with a vertically movable bolster; of a cluster of springs supporting said bolster on the truck side frame, said bolster guides presenting vertically disposed friction surfaces; of rocking friction elements having friction surfaces engaging said first named friction surfaces; and supporting brackets on said bolster to which the friction elements are pivotally connected, each friction element having a base portion extending beneath the bolster from the pivotal connection thereof with the bolster and bearing on said springs.

4. In a railway car truck including a truck side frame having spaced bolster guides, the combination with a vertically movable bolster; of a cluster of springs supporting said bolster on the truck side frame, said bolster guides presenting vertically disposed friction surfaces; of rocking friction elements having spaced guide ribs embracing said bolster guides, and a friction surface between said ribs engaging said first named friction surfaces; and supporting brackets on said bolster to which the friction elements are pivotally connected, each friction element having a base portion extending beneath the bolster from the pivotal connection thereof with the bolster and bearing on said springs.

5. In a railway car truck including a truck side frame having spaced bolster guides, the combination with a vertically movable bolster; of a cluster of truck springs supporting said bolster; and a rocking friction element having a portion rigid therewith hinged to said bolster to swing about an axis fixed with respect to the bolster, said elements having guide seats within which said bolster guides are engaged, each of said elements having a second portion rigid therewith having a friction surface engaging the corresponding bolster guide.

6. In a railway car truck including a truck side frame having spaced bolster guides, the combination with a vertically movable bolster; of a cluster of springs supporting said bolster on the side frame; and rocking friction elements, each of said elements including a portion rigid therewith hinged to said bolster for swinging movement about an axis fixed with respect to the bolster, said elements being movable with said bolster, each of said rocking elements having spaced vertical guide ribs embracing the corresponding bolster guide, a friction surface between said ribs engaging said guide, and a base portion rigid with said element, the base portions of said elements bearing on said springs, whereby the expansive action of the springs rocks said friction elements to force the friction surfaces thereof into tight frictional engagement with the bolster guides.

7. In a railway car truck including a truck side frame having spaced bolster guides, the combination with a vertically movable bolster; of a cluster of truck springs supporting said bolster on the truck side frame; and a pair of friction elements at opposite sides of the bolster, each element having a base plate integral therewith and an upstanding wall at the outer end of said base plate having a lengthwise extending friction surface in sliding frictional engagement with the corresponding bolster guide, said base portions of said elements being hinged to the bolster at their outer ends, said base portions of said elements being interposed between the underneath side of the bolster and the spring cluster and bearing on the top of said cluster.

8. In a railway car truck including a truck side frame having spaced bolster guides, the combination with a vertically movable bolster; of a cluster of truck springs supporting said bolster on the truck side frame; and vertically movable friction elements slidable on said bolster guides, said elements being hinged to the bolster at their lower ends, said friction elements having integral, laterally inwardly projecting base plate portions at the lower ends thereof interposed between the bolster and springs and bearing on the upper ends of said springs.

HARVEY J. LOUNSBURY.